US011322731B2

(12) United States Patent
Park et al.

(10) Patent No.: US 11,322,731 B2
(45) Date of Patent: May 3, 2022

(54) LITHIUM SECONDARY BATTERY

(71) Applicant: LG CHEM, LTD., Seoul (KR)

(72) Inventors: Eunkyung Park, Daejeon (KR); Minchul Jang, Daejeon (KR); Suk Il Youn, Daejeon (KR); Byoungkuk Son, Daejeon (KR); Junghun Choi, Daejeon (KR); Bora Jung, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 40 days.

(21) Appl. No.: 16/474,303

(22) PCT Filed: Jun. 21, 2018

(86) PCT No.: PCT/KR2018/007042
§ 371 (c)(1),
(2) Date: Jun. 27, 2019

(87) PCT Pub. No.: WO2018/236168
PCT Pub. Date: Dec. 27, 2018

(65) Prior Publication Data

US 2019/0341601 A1 Nov. 7, 2019

(30) Foreign Application Priority Data

Jun. 21, 2017 (KR) ........................ 10-2017-0078607
Jun. 20, 2018 (KR) ........................ 10-2018-0070926

(51) Int. Cl.
*H01M 4/131* (2010.01)
*H01M 4/04* (2006.01)
(Continued)

(52) U.S. Cl.
CPC ............. *H01M 4/131* (2013.01); *H01M 4/04* (2013.01); *H01M 4/364* (2013.01); *H01M 4/405* (2013.01);
(Continued)

(58) Field of Classification Search
CPC ...... H01M 4/0445; H01M 4/13; H01M 4/131; H01M 4/04; H01M 4/364; H01M 4/405;
(Continued)

(56) References Cited

U.S. PATENT DOCUMENTS 5,744,265 A 4/1998 Barker et al.
6,255,020 B1 7/2001 Yamashita et al.
(Continued)

FOREIGN PATENT DOCUMENTS

CN 101164186 A 4/2008
CN 202259535 U 5/2012
(Continued)

OTHER PUBLICATIONS

Extended European Search Report dated Dec. 20. 2019, for European Application No. 18819917.8.
(Continued)

*Primary Examiner* — Victoria H Lynch
(74) *Attorney, Agent, or Firm* — Birch, Stewart, Kolasch & Birch, LLP

(57) ABSTRACT

A lithium secondary battery which is made of an anode-free battery and includes lithium metal formed on a negative electrode current collector by charging. The lithium secondary battery includes the lithium metal formed on the negative electrode current collector in a state of being shielded from the atmosphere, so that the generation of a surface oxide layer (native layer) formed on the negative electrode according to the prior art does not occur fundamentally, thereby preventing the deterioration of the efficiency and life characteristics of the battery.

14 Claims, 4 Drawing Sheets

(51) Int. Cl.
*H01M 4/36* (2006.01)
*H01M 4/40* (2006.01)
*H01M 4/485* (2010.01)
*H01M 4/505* (2010.01)
*H01M 4/525* (2010.01)
*H01M 4/62* (2006.01)
*H01M 4/66* (2006.01)
*H01M 10/0525* (2010.01)
*H01M 4/02* (2006.01)

(52) U.S. Cl.
CPC ........... *H01M 4/485* (2013.01); *H01M 4/505* (2013.01); *H01M 4/525* (2013.01); *H01M 4/621* (2013.01); *H01M 4/661* (2013.01); *H01M 10/0525* (2013.01); *H01M 2004/028* (2013.01)

(58) Field of Classification Search
CPC ...... H01M 4/485; H01M 4/505; H01M 4/525; H01M 4/661; H01M 10/0525; H01M 2004/027; H01M 4/382
See application file for complete search history.

(56) References Cited

U.S. PATENT DOCUMENTS

| | | | | |
|---|---|---|---|---|
| 2004/0157124 | A1 | 8/2004 | Goh et al. | |
| 2006/0257737 | A1 | 11/2006 | Goh et al. | |
| 2009/0325072 | A1* | 12/2009 | Maeda | H01M 4/364 429/220 |
| 2010/0104948 | A1* | 4/2010 | Skotheim | H01M 10/36 429/322 |
| 2013/0188294 | A1 | 7/2013 | Kim et al. | |
| 2014/0087260 | A1* | 3/2014 | Kishimi | H01M 4/366 429/221 |
| 2016/0043403 | A1* | 2/2016 | Kim | H01M 10/0525 429/221 |
| 2016/0156027 | A1* | 6/2016 | Kim | H01M 4/525 429/223 |
| 2016/0336625 | A1 | 11/2016 | Jeong et al. | |
| 2017/0104209 | A1 | 4/2017 | Son et al. | |
| 2017/0133660 | A1 | 5/2017 | Kurihara et al. | |
| 2017/0244093 | A1* | 8/2017 | Fan | H01M 4/505 |
| 2018/0197691 | A1 | 7/2018 | Song et al. | |

FOREIGN PATENT DOCUMENTS

| | | | |
|---|---|---|---|
| CN | 103000880 | A | 3/2013 |
| CN | 105609783 | A | 5/2016 |
| EP | 0 875 951 | A1 | 11/1998 |
| EP | 2 270 901 | A1 | 1/2011 |
| JP | 10-302794 | A | 11/1998 |
| JP | 2000-512425 | A | 9/2000 |
| JP | 2002-237293 | A | 8/2002 |
| JP | 2006-172851 | A | 6/2006 |
| JP | 2008-547156 | A | 12/2008 |
| JP | 2010-231950 | A | 10/2010 |
| JP | 2011-159596 | A | 8/2011 |
| JP | 2015-69809 | A | 4/2015 |
| JP | 2016-122528 | A | 7/2016 |
| JP | 2016-219411 | A | 12/2016 |
| KR | 10-0285123 | B1 | 3/2001 |
| KR | 10-2004-0095851 | A | 11/2004 |
| KR | 10-0484713 | B1 | 4/2005 |
| KR | 10-2006-0111393 | A | 10/2006 |
| KR | 10-2012-0035131 | A | 4/2012 |
| KR | 10-2013-0112567 | A | 10/2013 |
| KR | 10-2013-0134949 | A | 12/2013 |
| KR | 10-1551521 | B1 | 9/2015 |
| KR | 10-2016-0052323 | A | 5/2016 |
| KR | 10-2016-0138120 | A | 12/2016 |
| KR | 10-2017-0003209 | A | 1/2017 |
| KR | 10-2017-0061866 | A | 6/2017 |

OTHER PUBLICATIONS

Park et al., "$Li_2NiO_2$ as a sacrificing positive additive for lithium-ion batteries", Electrochimica Acta, vol. 108, 2013, pp. 591-595.
International Search Report (PCT/ISA/210) issued in PCT/KR2018/007042, dated Oct. 30, 2018.

* cited by examiner

【Figure 1】
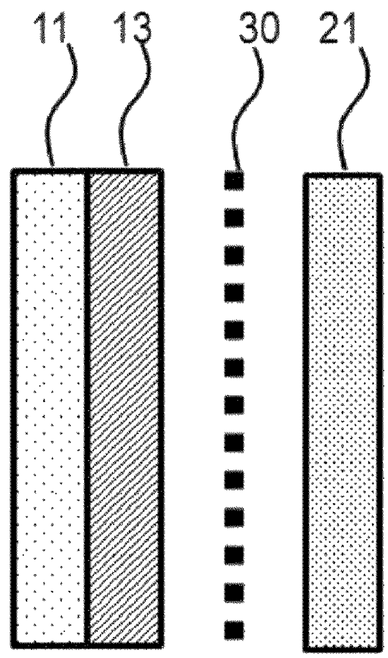
【Figure 2】
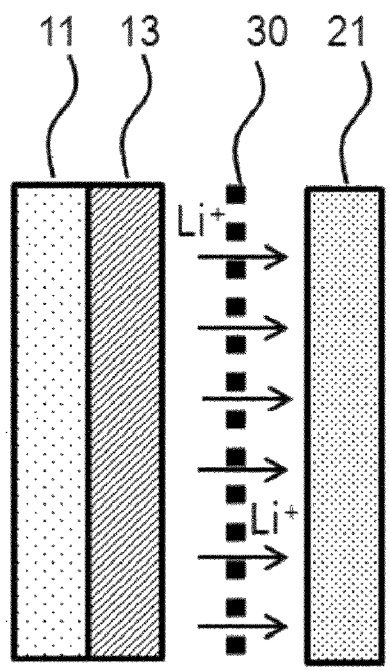

【Figure 3】
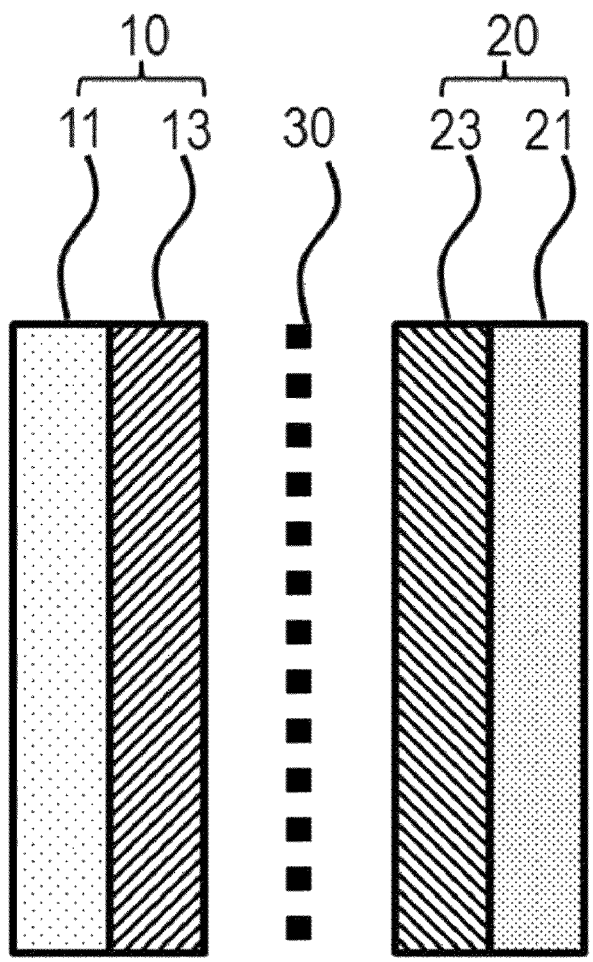

【Figure 4】
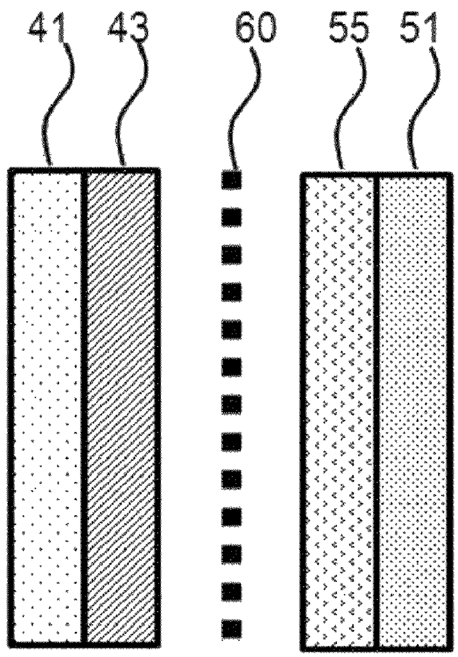
【Figure 5】
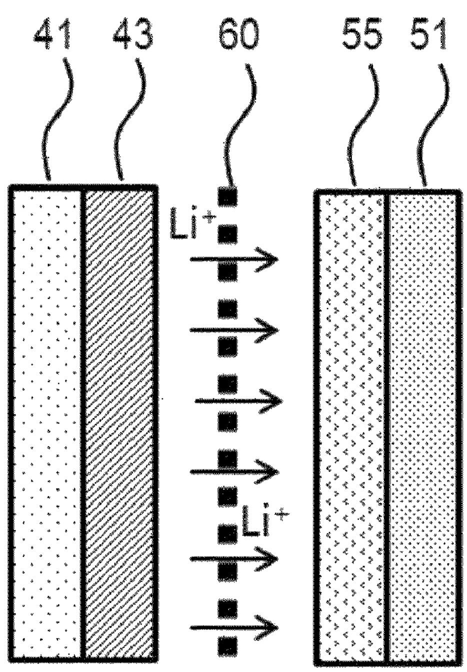

【Figure 6】
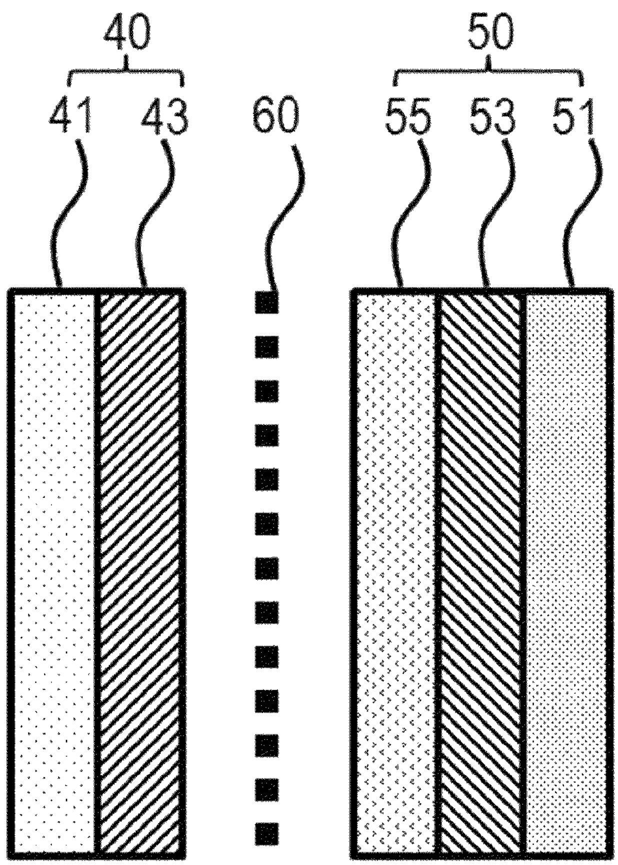

LITHIUM SECONDARY BATTERY

TECHNICAL FIELD

This application claims the benefits of priorities based on Korean Patent Application No. 10-2017-0078607, filed on Jun. 21, 2017 and Korean Patent Application No. 10-2018-0070926, filed on Jun. 20, 2018, the entire contents of which are incorporated herein by reference.

The present invention relates to a lithium secondary battery having an anode free structure using a high-irreversible positive electrode material.

BACKGROUND ART

Recently, various devices that require batteries, such as mobile phones, wireless household appliances, and electric vehicles, are being developed. With the development of these devices, the demand for the secondary battery is also increasing. Particularly, along with the miniaturization tendency of electronic products, the secondary batteries are also becoming lighter and smaller.

In accordance with this trend, recently, a lithium secondary battery, which uses lithium metal as an active material, has attracted attention. Lithium metal has the characteristics of low redox potential (−3.045 V vs. standard hydrogen electrode) and high weight energy density (3,860 mAhg-1), so it is expected as a negative electrode material for the high capacity secondary battery However, when lithium metal is used as a negative electrode of the battery, the battery is manufactured by attaching a lithium foil to the current collector on a planar surface, but lithium is an alkali metal which reacts explosively with water and reacts with oxygen in the atmosphere because of its high reactivity, and thus has a disadvantage in that it is difficult to manufacture and use in a normal environment. In particular, when lithium metal is exposed to the atmosphere, an oxide layer such as LiOH, $Li_2O$, $Li_2CO_3$ and the like is formed as a result of oxidation. When the surface oxide layer (native layer) is present on the surface, the oxide layer acts as an insulating film, and thus there arise problems that the electric conductivity is lowered, and the smooth movement of the lithium ions is inhibited, thereby increasing the electric resistance For this reason, although the problem of surface oxide layer formation due to the reactivity of lithium metal was partially improved by performing a vacuum deposition process to form a lithium negative electrode, it is still exposed to the atmosphere in the battery assembly process, and it is impossible to fundamentally inhibit the formation of the surface oxide layer. Therefore, it is required to develop a lithium metal electrode which can solve the reactivity problem of lithium while improving the energy efficiency by using lithium metal and can simplify the process more easily.

Patent Literature

Korean Patent Application Laid-Open Publication No. 10-2016-0052323, "Lithium electrode and lithium battery containing the same"

DISCLOSURE

Technical Problem

In order to solve the above problems, the inventors of the present invention have conducted various studies and as a result have designed an anode-free battery structure capable of forming a lithium metal layer on a negative electrode current collector by lithium ions transferred from a positive electrode active material by charging after assembling the battery in order to prevent the contact of lithium metal with atmosphere at the time of assembling the battery and developed a positive electrode active material composition capable of stably forming the lithium metal layer.

Accordingly, it is an object of the present invention to provide a lithium secondary battery having improved performance and service life by solving the problem caused by the reactivity of lithium metal and the problems occurring in the assembly process.

Technical Solution

In order to achieve the above object, the present invention provides a lithium secondary battery comprising a positive electrode, a negative electrode, and a separator and an electrolyte interposed therebetween, wherein the negative electrode has lithium metal formed on the negative electrode current collector, which is moved from the high-irreversible positive electrode active material with initial irreversibility of 50% or more by initial charging.

At this time, the lithium metal formed on the negative electrode current collector is formed through one-time charge at a voltage of 4.5V to 2.5V.

In addition, the negative electrode may further comprise a protective layer formed on the surface in contact with the separator.

Advantageous Effects

The lithium secondary battery according to the present invention is coated in a state of being shielded from the atmosphere through the process of forming a lithium metal layer on the negative electrode current collector, and thus can inhibit the formation of the surface oxide layer of lithium metal due to atmospheric oxygen and moisture, and consequently has an effect of improving cycle life characteristics.

DESCRIPTION OF DRAWINGS

FIG. 1 is a schematic diagram of a lithium secondary battery manufactured according to the first embodiment of the present invention.

FIG. 2 is a schematic diagram showing the migration of lithium ions ($Li^+$) during the initial charging of a lithium secondary battery manufactured according to the first embodiment of the present invention.

FIG. 3 is a schematic diagram of a lithium secondary battery manufactured according to the first embodiment of the present invention after initial charging was completed FIG. 4 is a schematic diagram of a lithium secondary battery manufactured according to the second embodiment of the present invention.

FIG. 5 is a schematic diagram showing the migration of lithium ions ($Li^+$) during the initial charging of a lithium secondary battery manufactured according to the second embodiment of the present invention.

FIG. 6 is a schematic diagram of a lithium secondary battery manufactured according to the second embodiment of the present invention after initial charging was completed.

BEST MODE

Hereinafter, the present invention will now be described more fully with reference to the accompanying drawings to be readily carried out by one of ordinary skill in the art. The present invention may, however, be embodied in many different forms and should not be construed as limited to the embodiments set forth herein.

In the drawings, parts not related to the description were omitted in order to clearly illustrate the present invention, and similar reference numerals have been used for like parts throughout the specification. Also, the size and relative size of the components shown in the figures are independent of the actual scale and may be reduced or exaggerated for clarity of description.

FIG. 1 is a cross-sectional view of a lithium secondary battery manufactured according to the first embodiment of the present invention, which comprises a positive electrode comprising a positive electrode current collector 11 and a positive electrode mixture 13; a negative electrode comprising a negative electrode current collector 21; and a separator 30 and an electrolyte (not shown) interposed therebetween.

The negative electrode of the lithium secondary battery is typically constructed by forming a negative electrode on a negative electrode current collector 21. However, in the present invention, an anode-free battery structure is assembled by using only a negative electrode current collector 21, and then lithium ions released from the positive electrode mixture 13 by charging form a lithium metal (not shown) as a negative electrode mixture on the negative electrode current collector 21, and thus the negative electrode having the structure of the known negative electrode current collector/negative electrode assembly is formed to constitute the typical lithium secondary battery.

That is, the term, an anode-free battery as used in the present invention may refer to a battery which is free of an anode, in which no negative electrode is formed on the negative electrode current collector during the initial assembly, and it may be a concept that comprises all of the batteries which may have a negative electrode which is formed on the negative electrode current collector upon using.

In addition, in the negative electrode of the present invention, the form of the lithium metal formed as a negative electrode mixture on the negative electrode current collector comprises both a form, in which lithium metal is layered, and a form, in which lithium metal is not layered, (for example, a structure in which lithium metal is aggregated in the form of particle).

Hereinafter, the present invention will be described on the basis of the form of the lithium metal layer 23, in which lithium metal is layered, but it is clear that the description does not exclude structures other than the form in which lithium metal is layered.

FIG. 2 is a schematic diagram showing the migration of lithium ions ($Li^+$) during the initial charging of a lithium secondary battery manufactured according to the first embodiment of the present invention, and FIG. 3 is a schematic diagram of a lithium secondary battery manufactured according to the first embodiment of the present invention after initial charging was completed.

Referring to FIGS. 2 and 3, when the charging is proceeded by applying a voltage higher than a certain level to the lithium secondary battery having the anode free battery structure, lithium ions are removed from the positive electrode mixture 13 in the positive electrode 10 and pass through the separator 30 and migrate toward the negative electrode current collector 21, thereby forming a lithium metal layer 23 consisting purely of lithium on the negative electrode current collector 21 to constitute a negative electrode 20.

The formation of the lithium metal layer 23 through such charging has advantages in that a layer of a thin film may be formed and it is very easy to control the interface characteristics, in comparison with the negative electrode formed by sputtering the lithium metal layer 23 on the negative electrode current collector 21 or by laminating the lithium foil and the negative electrode current collector 21 according to the prior art. In addition, since the bonding strength of the lithium metal layer 23 laminated on the negative electrode current collector 21 is large and stable, the problem of being removed from the negative electrode current collector 21 due to ionization again through discharging does not occur.

In particular, since the anode-free battery structure is formed and thus lithium metal is not exposed to the atmosphere during the assembling process of the battery, conventional problems such as formation of the oxide layer on the surface due to the high reactivity of lithium itself and thus deterioration of the service life of the lithium secondary battery can be fundamentally blocked.

The lithium secondary battery having such an anode-free structure can be implemented by various methods, but in the present invention, implemented by controlling the composition used in the positive electrode mixture 13.

The positive electrode mixture 13 may be composed of various positive electrode active materials depending on the type of the battery. The positive electrode active material used in the present invention is not particularly limited as long as it is a material capable of occluding and releasing lithium ions. However, a lithium transition metal oxide is typically used as a positive electrode active material capable of realizing battery with excellent life characteristics and charging/discharging efficiency.

The lithium transition metal oxide may be, but is not limited to, a layered compound, for example, lithium cobalt oxide ($LiCoO_2$) or lithium nickel oxide ($LiNiO_2$) substituted with one or more transition metals, which contains at least two transition metals; lithium manganese oxide, lithium nickel-based oxide, spinel-based lithium manganese composite oxide, spinel-based lithium manganese oxide in which a portion of Li in formula is replaced with an alkaline earth metal ion, olivine-based lithium metal phosphate and the like, which were substituted with one or more transition metals.

It is preferable to use a lithium-containing transition metal oxide. For example, the lithium-containing transition metal oxide may be at least one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-Y}Co_YO_2$, $LiCo_{1-Y}Mn_Y O_2$, $LiNi_{1-Y}Mn_YO_2$ (wherein $0 \leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $Li_xM_y Mn_{2-y}O_{4-z}A_z$ (wherein $0.9 \leq x \leq 1.2$, $0<y<2$, $0 \leq z<0.2$, M=at least one of Al, Mg, Ni, Co, Fe, Cr, V, Ti, Cu, B, Ca, Zn, Zr, Nb, Mo, Sr, Sb, W, Ti and Bi, and A is at least one −1-valent or −2-valent anion), $Li_{1+a} Ni_bM'_{1-b}O_{2-c}A'_c$ (wherein $0 \leq a \leq 0.1$, $0 \leq b \leq 0.8$, and $0 \leq c<0.2$, M' is at least one selected from the group consisting of stable 6-coordination elements such as Mn, Co, Mg, Al and the like, and A' is at least one −4 valent or −2 valent anion), $LiCoPO_4$, and $LiFePO_4$, and preferably $LiCoO_2$ may be used. In addition to the oxide, sulfide, selenide and halide can also be used.

The lithium transition metal oxide is used as positive electrode active material in a positive electrode mixture 13 together with a binder and a conductive material. In the anode-free battery structure of the present invention, the lithium source for forming the lithium metal layer 23 is the lithium transition metal oxide. That is, the lithium ions in the lithium transition metal oxide are desorbed to form a lithium metal layer 23 on the negative electrode current collector 21, when performing charging in a certain range of voltage range.

However, in fact, since the lithium ion in the lithium transition metal oxide is not easily self-desorbed and there is no lithium that can be associated at the operating voltage level, in addition to charging/discharging, the formation of the lithium metal layer 23 is very difficult, and when only the lithium transition metal oxide is used, since the irreversible capacity is greatly reduced, there arises a problem that the capacity and life characteristics of the lithium secondary battery are degraded.

Therefore, the present invention uses a lithium metal compound together, as an additive capable of providing a lithium source to the lithium transition metal oxide, which is a high-irreversible material having initial charging capacity of 200 mAh/g or more, or initial irreversibility of 30% or more when performing a single charging at 0.01 to 0.2 C in a voltage range of 4.5 V to 2.5 V.

The term 'high-irreversible material' referred to in the present invention can be used in the same sense as the other term 'large-capacity irreversible material', and this means a material having a high ratio of the irreversible capacity of the first cycle of charging/discharging, i.e., "(first cycle charging capacity—first cycle discharging capacity)/first cycle charging capacity". That is, the high-irreversible materials can provide an irreversibly excessive amount of lithium ions during the first cycle of charging/discharging. For example, the high-irreversible material can be a positive electrode material with a large irreversible capacity at the first cycle of charging/discharging (first cycle charging capacity—first cycle discharging capacity) among lithium transition metal compounds that can occlude and release lithium ions.

The irreversible capacity of the commonly used positive electrode active material is about 2 to 10% of the initial charging capacity. However, in the present invention, the lithium metal compound which is a high-irreversible material, that is, a lithium metal compound having an initial irreversible capacity of 30% or more, preferably 50% or more of the initial charging capacity can be used together. In addition, the lithium metal compound having an initial charging capacity of 200 mAh/g or more, preferably 230 mAh/g or more may be used. Such a lithium metal compound plays a role as a lithium source capable of forming the lithium metal layer 23 while increasing the irreversible capacity of the lithium transition metal oxide, a positive electrode active material.

The lithium metal compounds proposed in the present invention can be compounds represented by the following Formula 1 to Formula 8.

$$Li_2Ni_{1-a}M^1_aO_2 \quad \text{[Formula 1]}$$

(wherein $0 \leq a < 1$, and $M^1$ is at least one element selected from the group consisting of Mn, Fe, Co, Cu, Zn, Mg and Cd);

$$Li_{2+b}Ni_{1-c}M^2_cO_{2+d} \quad \text{[Formula 2]}$$

(wherein $-0.5 \leq b < 0.5$, $0 \leq c \leq 1$, and $0 \leq d < 0.3$, and $M^2$ is at least one element selected from the group consisting of P, B, C, Al, Sc, Sr, Ti, V, Zr, Mn, Fe, Co, Cu, Zn, Cr, Mg, Nb, Mo and Cd);

$$LiM^3_eMn_{1-e}O_2 \quad \text{[Formula 3]}$$

(wherein e is $0 \leq e < 0.5$, and $M^3$ is at least one element selected from the group consisting of Cr, Al, Ni, Mn and Co);

$$Li_2M^4O_2 \quad \text{[Formula 4]}$$

(wherein $M^4$ is at least one element selected from the group consisting of Cu and Ni);

$$Li_{3+f}Nb_{1-g}M^5_gS_{4-h} \quad \text{[Formula 5]}$$

(wherein $-0 \leq f \leq 1$, $0 \leq g \leq 0.5$, and $-0.1 \leq h \leq 0.5$, and $M^5$ is at least one element selected from the group consisting of Mn, Fe, Co, Cu, Zn, Mg and Cd);

$$LiM^6_iMn_{1-i}O_2 \quad \text{[Formula 6]}$$

(wherein i is $0.05 \leq i < 0.5$, and $M^6$ is at least one element selected from the group consisting of Cr, Al, Ni, Mn, and Co);

$$LiM^7_{2j}Mn_{2-2j}O_4 \quad \text{[Formula 7]}$$

(wherein j is $0.05 \leq j < 0.5$, and $M^7$ is at least one element selected from the group consisting of Cr, Al, Ni, Mn, and Co);

$$Li_k\text{-}M^8_m\text{—}N_n \quad \text{[Formula 8]}$$

(wherein $M^8$ is an alkaline earth metal, k/(k+m+n) is 0.10 to 0.40, m/(k+m+n) is 0.20 to 0.50, n/(k+m+n) is 0.20 to 0.50).

The lithium metal compounds of Formulas 1 to 8 have different irreversible capacities depending on the structure, and they can be used alone or in combination and serve to increase the irreversible capacity of the positive electrode active material.

For example, the high irreversible materials represented by Formulas 1 and 3 have different irreversible capacities depending on their types, and for example, the values shown in Table 1 below.

TABLE 1

| | Initial charging capacity (mAh/g) | Initial discharging capacity (mAh/g) | Initial Coulomb efficiency | Ratio of initial irreversible capacity |
|---|---|---|---|---|
| [Formula 1] $Li_2NiO_2$ | 370 | 110 | 29.7% | 70.3% |
| [Formula 3] $LiMnO_2$ | 230 | 100 | 43.5% | 56.5% |
| [Formula 3] $LiCr_xMn_{1-x}O_2$ | 230 | 80 | 34.8% | 65.2% |

In addition, the lithium metal compounds of Formula 2 belonging to space group Immm are preferred, and among them, it is more preferable that Ni, M composite oxide form a planar four-coordinate (Ni, M)O4, and the planar four-coordinate structure shares the opposite side (side formed by O—O) and forms a primary chain, it is preferable that the crystal lattice constants of the compound of Formula 2 are a=3.7±0.5 Å, b=2.8±0.5 Å, c=9.2±0.5 Å, $\alpha=90°$, $\beta=90°$, and $\gamma=90°$.

In addition, the lithium metal compound of Formula 8 has an alkaline earth metal content of 30 to 45% by atom and a nitrogen content of 30 to 45% by atom. At this time, when the content of the alkaline earth metal and the content of nitrogen are within the above range, the thermal characteristics and lithium ion conduction characteristics of the compound of Formula 1 are excellent. Additionally, in Formula 8, k/(k+m+n) is 0.15 to 0.35, for example, 0.2 to 0.33, m/(k+m+n) is 0.30 to 0.45, and n/(k+m+n) is 0.30 to 0.45, for example, 0.31 to 0.33.

According to one embodiment, the electrode active material of the Formula 1 has a in the range of 0.5 to 1, b of 1, and c of 1.

The positive electrode mixture 13 according to the present invention needs to be limited in contents of the positive electrode active material and the lithium metal compound. In other words, the parameters affected by the content of the lithium metal compound are the thickness of the lithium metal layer 23 and the loading amount in the positive electrode active material, which are in a trade-off relationship with each other.

Normally, the thicker the lithium metal layer 23, the better the life characteristics. Accordingly, when the amount of the lithium metal compound as the lithium source is large, the advantage of increasing the thickness of the lithium metal layer 23 formed on the negative electrode current collector 21 can be secured, but there is a problem that the amount of the positive electrode active material loaded in the entire positive electrode mixture is reduced. The loading amount of the positive electrode active material thus reduced causes a decrease in overall battery capacity. On the contrary, when the content of the lithium metal compound is small, there are disadvantages that the loading amount of the positive electrode active material is high but irreversibility cannot be compensated enough. However, it is possible to form the lithium metal layer 23 of a relatively thin thickness rather than the commercially available lithium foil, thereby reducing the thickness and weight of the battery.

For this reason, the positive electrode mixture 13 proposed in the present invention is used in a weight ratio of the positive electrode active material:the lithium metal compound of 1:9 to 9:1, preferably 2:8 to 8:2, more preferably 3:7 to 7:3. Preferably, the lithium metal compound is used within 70% based on the total weight of the positive electrode mixture. Specifically, it is preferable to use the positive electrode active material: lithium metal compound in the range of weight ratio of 9:1 to 3:7. Through this content range, the positive electrode mixture of the present invention has a loading amount of 1 to 10 $mAh/cm^2$, preferably a loading amount of 2 to 10 $mAh/cm^2$, more preferably a loading amount of 3 to 10 $mAh/cm^2$. In addition, as the lithium secondary battery of the present invention uses the positive electrode mixture as described above, a secondary battery with a negative electrode on which lithium was formed can be constructed after the first charging.

The lithium metal compounds of Formulas 1 to 8 are characterized by the ability to achieve a capacity recovery of 90% or more after the over-discharging test at the same time without reducing the capacity of the battery, by adjusting the irreversible capacity of the positive electrode. The lithium metal compound is a material capable of releasing 1 mole or more of lithium ions during the first cycle charging and capable of occluding and releasing 1 mole or less of lithium ions in the cycles after the first cycle discharging. Therefore, when the lithium metal compound is added to the positive electrode, excess lithium (Li) as much as the desired capacity in the first cycle can be formed by forming Li on the negative electrode by the irreversible capacity of the positive electrode.

The positive electrode active material according to the present invention comprises the lithium transition metal oxide and the lithium metal compounds of Formulas 1 to 8, and at this time, the forms thereof are not particularly limited as long as lithium can be irreversibly released from the lithium metal sulfur compound.

For example, the positive electrode active material and the lithium metal compound may be dispersed into the positive electrode mixture 13 in a mixed state with each other or may be also formed in a core-shell structure. In the core-shell structure, the core may be the positive electrode active material or the lithium metal compound, and the shell may be the lithium metal or the positive electrode active material. Also, if desired, the form of their mixture can form the core and shell, respectively. In addition, the shell can be formed as a single layer or multiple layers. Preferably, when the shell is formed of the lithium metal compound, lithium ions can easily be released from the lithium metal compound by charging the battery.

In one embodiment, the lithium metal compound may be coated on the current collector in admixture with the positive electrode active material.

In another embodiment, the first coating layer comprising the positive electrode active material is coated on the current collector and the coating layer comprising the lithium metal compound may be applied on the first coating layer.

Specifically, since the first coating layer is composed of the positive electrode active material, the conductive material and the binder and the second coating layer is composed of the lithium metal compound, the conductive material and the binder, the lithium metal compound of the second coating layer is transformed into an irreversible state during the activation of the secondary battery and then can act as a protective layer for the first coating layer.

That is, the second coating layer is in the form of a metal sulfide compound, from which lithium is removed from the lithium metal compound, and is thermally and electrochemically stable, and thus can protect the first coating layer by suppressing the side reaction of the electrode and the electrolyte solution.

The positive electrode active material of these simple mixing and core-shell structures are used according to the above-mentioned contents.

In addition, the positive electrode active material according to the present invention may additionally comprise a known material capable of enhancing the irreversible capacity, for example, a material such as $LixVO_3$ ($1 \leq x \leq 6$), $Li_3Fe_2(PO_4)_3$, $Li_3Fe_2(SO_4)_3$, or $Li_3V(PO_4)_3$, or a material such as $MnO_2$, $MoO_3$, $VO_2$, $V_2O_5$, $V_6O_{13}$, $Cr_3O_8CrO_2$, $V_2Al_2O_3$, $ZrO_2$, $AlPO_4$, $SiO_2$, $TiO_2$, or MgO.

These materials are used in an amount of not more than parts by weight, not more than 50 parts by weight, preferably not more than 40 parts by weight, based on 100 parts by weight of the positive electrode active material.

Also, in the present invention, the charging for forming the lithium metal layer 23 is performed once at 0.01 to 0.2C in the voltage range of 4.5V to 2.5V. If the charging is performed below the above range, the formation of the lithium metal layer 23 becomes difficult. On the contrary, if the charging is performed above the range, over-discharging due to damage of the battery occurs and then the charging/discharging does not proceed properly.

The lithium metal layer 23 formed above forms a uniform continuous or discontinuous layer on the negative electrode current collector 21. For example, if the negative electrode current collector 21 is in the form of a foil, it can have a form of the continuous thin film, and if the negative electrode current collector 21 has a three-dimensional porous structure, the lithium metal layer 23 may be discontinuously formed. That is, a discontinuous layer means that the region where the lithium metal layer 23 exists is distributed without continuity, because the region where the lithium metal layer 23 exists and the region where the lithium metal layer 23 does not exist are present in a discontinuous distribution in the specific region and also the region where the lithium metal layer 23 exists is distributed so as to interrupt, isolate or separate, like an island type, the region where the lithium compound exists by the region where the lithium metal layer 23 does not exist.

The lithium metal layer 23 formed through such charging/discharging has a thickness of 50 nm or more and 100 μm or less, preferably 1 μm to 50 μm, for the function as a negative electrode. If the thickness is less than the above range, the charging/discharging cycle life of the battery is drastically reduced. On the contrary, if the thickness exceeds the above range, life characteristics and the like are stable, but there is a problem that the energy density of the battery is lowered.

Particularly, the battery is manufactured as an anode-free battery without lithium metal at the time of assembling. Accordingly, an oxide layer generated during the assembly process due to the high reactivity lithium is not formed or hardly formed on the lithium metal layer 23, in comparison with lithium secondary battery assembled using conventional lithium foil. Thus, a degradation phenomenon of the service life of the battery due to the oxidation layer can be prevented.

Also, the lithium metal layer 23 is moved by charging the high-irreversible material, and it can form a more stable lithium metal layer 23 in comparison with the lithium metal layer 23 formed on the positive electrode. When the lithium metal is attached on the positive electrode, a chemical reaction between the positive electrode and the lithium metal may occur.

The positive electrode mixture 13 comprising the positive electrode active material and the lithium metal compound is constituted, and at this time, the positive electrode mixture 13 may further comprise conductive materials, binders, and other additives commonly used in lithium secondary batteries.

The conductive material is used to further improve the electrical conductivity of the electrode active material. Such conductive material is not particularly limited as long as it has electrical conductivity without causing a chemical change in the battery, and for example may be graphite such as natural graphite and artificial graphite; carbon blacks such as carbon black, acetylene black, Ketjen black, channel black, furnace black, lamp black, and summer black, etc.; electrically conductive fibers such as carbon fiber and metal fiber, etc.; metal powders such as carbon fluorine, aluminum, and nickel powder, etc.; electrically conductive whiskers such as zinc oxide and potassium titanate, etc.; an electrically conductive metal oxides such as titanium oxide, etc.; or polyphenylene derivatives, etc.

A binder may further be included for the binding of the positive electrode active material, the lithium metal compound and the conductive material and for the binding to the current collector. The binder may comprise a thermoplastic resin or a thermosetting resin. For example, polyethylene, polypropylene, polytetrafluoroethylene (PTFE), polyvinylidene fluoride (PVDF), styrene-butadiene rubber, tetrafluoroethylene-perfluoroalkylvinylether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, or ethylene-acrylic acid copolymers, etc. may be used alone or in combination, but are not necessarily limited thereto, and any binders are possible as long as they can be used as binders in the art.

Examples of other additives comprise fillers. The filler is optionally used as a component for suppressing the expansion of the electrode and is not particularly limited as long as it is a fibrous material without causing a chemical change in the battery. For example, fibrous materials such as an olefinic polymer such as polyethylene or polypropylene, or glass fiber or carbon fiber, etc. are used.

A positive electrode mixture 13 of the present invention is formed on a positive electrode current collector 11.

The positive electrode current collector generally is formed in the thickness of 3 to 500 μm. The positive electrode current collector 11 is not particularly limited as long as it has high conductivity without causing chemical change in the battery, the examples thereof may be stainless steel, aluminum, nickel, titanium, sintered carbon, or aluminum or stainless steel surface-treated with carbon, nickel, titanium or silver. At this time, the positive electrode current collector 11 may be used in various forms such as film, sheet, foil, net, porous substance, foam or nonwoven fabric having fine irregularities formed on its surface so as to increase the adhesive force with the positive electrode active material.

The method of applying the positive electrode mixture 13 on the current collector may include a method in which a slurry of an electrode mixture is distributed onto a current collector and then uniformly dispersed using a doctor blade or the like, and methods such as die casting, comma coating, screen printing, etc. In addition, the slurry of the electrode mixture may be formed on a separate substrate, and then the slurry of the electrode mixture may be bonded to the current collector by a pressing or lamination method but is not limited thereto.

Also, in the anode-free battery structure of the present invention, the negative electrode current collector 21 constituting the negative electrode is generally made to have a thickness of 3 μm to 500 μm, The negative electrode current collector 21, in which the lithium metal layer 23 can be formed by charging, is not particularly limited as long as it has electrical conductivity without causing chemical change in the lithium secondary battery. The examples thereof may be copper, stainless steel, aluminum, nickel, titanium, sintered carbon, or aluminum or stainless steel surface-treated with carbon, nickel, titanium, silver or the like, or aluminum-cadmium alloy.

Also, Like the positive electrode current collector 11, the negative electrode current collector 21 may be used in various forms such as film, sheet, foil, net, porous substance, foam or nonwoven fabric having fine irregularities formed on its surface.

Meanwhile, in the lithium secondary battery according to the second embodiment of the present invention, a protective layer 55 may be additionally formed on the surface of the negative electrode in contact with the separator 60. Specifically, the protective layer 55 may be formed on a surface of the negative electrode on a negative electrode current collector 51 in contact with the separator 60.

Thus, when forming the protective layer 55, the lithium metal layer 53 is formed on the negative electrode current collector 51 by the lithium ions that are transferred from the positive electrode mixture 43 and passed through the protective layer 55, as shown in FIGS. 4-6.

Accordingly, the protective layer 55 may be any material capable of smoothly transferring lithium ions therethrough, the lithium ion conductive polymer and/or any material used for the inorganic solid electrolyte may be used as the protective layer, and the protective layer may further comprise a lithium salt if necessary The lithium ion conductive polymer may comprise, for example, but is not limited to, any one selected from the group consisting of polyethylene oxide (PEO), polyacrylonitrile (PAN), polymethylmethacrylate (PMMA), polyvinylidene fluoride (PVDF), polyvinylidene fluoride-hexafluoropropylene (PVDF-HFP), LiPON, $Li_3N$, $LixLa_{1-x}TiO_3$ (0<x<1) and $Li_2S$—GeS—$Ga_2S_3$ or a mixture of two or more thereof. The lithium ion conductive polymer can be used without restriction if it has conductivity for lithium ion.

The formation of the protective layer 55 using a lithium ion conductive polymer is performed by dissolving or swelling the lithium ion conductive polymer in a solvent to prepare a coating solution and coating it to the negative electrode current collector 51.

The method of coating the negative electrode current collector 51 may be selected from known methods in consideration of the characteristics of the material or may be performed by any new appropriate method. For example, it is preferable that the polymer protective layer composition is distributed onto the current collector, and then uniformly dispersed using a doctor blade or the like. In some cases, a method of executing the distribution and dispersion processes in one process may be used. In addition, the protective layer may be formed by methods such as dip coating, gravure coating, slit die coating, spin coating, comma coating, bar coating, reverse roll coating, screen coating, cap coating, etc. At this time, the negative electrode current collector 51 is the same as described above.

Thereafter, a drying process may be performed on the protective layer 55 formed on the negative electrode current collector 51, and at this time, the drying process may be performed by a method such as heating or hot air drying, etc. at a temperature of 80 to 120° C. depending on the type of the solvent used in the lithium ion conductive polymer.

In this case, the solvent to be used is preferably a solvent having a similar solubility index to the lithium ion conductive polymer and a low boiling point. This is because the mixing can be made uniform and then the solvent can be easily removed. Specifically, the solvent may be N,N'-dimethylacetamide (DMAc), dimethyl sulfoxide (DMSO), N,N-dimethylformamide (DMF), acetone, tetrahydrofuran, methylene chloride, chloroform, dimethylformamide, N-methyl-2-pyrrolidone (NMP), cyclohexane, water or a mixture thereof.

When the lithium ion conductive polymer is used, in order to further increase lithium ion conductivity, a substance used for this purpose is further included. For example, lithium salts such as LiCl, LiBr, LiI, $LiClO_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$ $(CF_3SO_2)_2NLi$, $(FSO_2)_2NLi$, chloroborane lithium, lower aliphatic carboxylic acid lithium, 4-phenylboric acid lithium, lithium imide and the like may be further included.

The inorganic solid electrolyte may be a crystalline or amorphous material of a ceramic-based material, and may be an inorganic solid electrolyte such as Thio-LISICON ($Li_{3.25}Ge_{0.25}P_{0.75}S_4$), $Li_2S$—$SiS_2$, LiI—$Li_2S$—$Si_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ (w is w<1), $Li_{3.6}Si_{0.6}P_{0.4}O_4$ and the like. In this case, when inorganic solid electrolytes are used, lithium salts may be further included if necessary.

The inorganic solid electrolyte may be mixed with known materials such as a binder and applied in a thick film form through slurry coating. Further, if necessary, it is possible to apply in the form of a thin film through a deposition process such as sputtering. The slurry coating method used can be appropriately selected based on the coating method, the drying method and the solvent as mentioned in connection with the lithium ion conductive polymer.

The protective layer 55 comprising the lithium ion conductive polymer and/or the inorganic solid electrolyte described above can simultaneously ensure the effect of inhibiting or preventing the formation of the lithium dendrite, which is generated when the lithium metal layer 53/the negative electrode current collector 51 are used as the negative electrode, while increasing the transfer rate of lithium ions and then facilitating the formation of the lithium metal layer 53.

In order to ensure the above effect, it is necessary to limit the thickness of the protective layer 55.

The lower the thickness of the protective layer 55, the better the output characteristics of the battery. However, only when the protective layer is formed over a certain thickness, the side reaction between the lithium and the electrolyte formed on the negative electrode current collector 51 can be suppressed subsequently and further the growth of the dendrite can be effectively blocked. In the present invention, the thickness of the protective layer 55 may be preferably 10 nm to 50 μm, more preferably 100 nm to 50 μm, and most preferably 1 μm to 50 μm. If the thickness of the protective layer 55 is less than the above range, the over-charging or the side reaction and the exothermic reaction between the lithium and the electrolyte which are increased under the conditions such as high temperature storage cannot be effectively suppressed and thus the safety cannot be improved. Also, if the thickness exceeds the above range, the composition of the protective layer 55 in the case of the lithium ion conductive polymer is required to be impregnated or swelled for a long time by the electrolytic solution and there is a concern that the movement of the lithium ions is lowered and the performance of the whole battery is deteriorated.

For the lithium secondary battery of the second embodiment of the present invention, the rests of the configuration except for the protective layer 55 are the same as those mentioned in the first embodiment.

Meanwhile, as shown in the structures of FIGS. 3 and 6, the lithium secondary battery may comprise the positive electrode 10 and 40, the negative electrode 20 and 50 and the separators 30 and 60 and the electrolyte (not shown) interposed therebetween, and the separators 30 and 60 may be excluded depending on the type of the battery.

In this case, the separators 30 and 60 may be made of a porous substrate. The porous substrate may be any porous substrate commonly used in an electrochemical device. For example, a polyolefin-based porous film or a nonwoven fabric may be used, but not particularly limited thereto.

The separators 30 and 60 according to the present invention are not particularly limited in their materials and any separators can be used without any particular limitation as long as they are separators commonly used as the separators 30 and 60 in the lithium secondary battery, while physically separating the positive electrode and the negative electrode from each other and having a permeability to electrolyte and ions. However, materials that are porous, nonconductive, or insulative, especially those that have low resistance to migration of ions in the electrolyte solution and have good wetting ability for the electrolyte solution are desirable. For example, a polyolefin-based porous membrane or nonwoven fabric may be used, but it is not particularly limited thereto.

Examples of the polyolefin-based porous membrane may be a membrane formed of any polymer alone selected from polyethylenes such as high density polyethylene, linear low density polyethylene, low density polyethylene and ultra high molecular weight polyethylene, and polyolefin-based polymers such as polypropylene, polybutylene and polypentene or formed of a polymer mixture thereof.

In addition to the above-mentioned polyolefin-based nonwoven fabric, the nonwoven fabric may be a nonwoven fabric formed of, for example, any polymer alone selected from polyphenylene oxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester, and the like, or formed of a polymer mixture thereof. Such nonwoven fabrics comprise a nonwoven fabric in the form of a fiber to form a porous web, that is, a spunbond or a meltblown nonwoven fabric composed of long fibers.

The thicknesses of the separators 30 and 60 are not particularly limited, but are preferably in the range of 1 to 100 μm, more preferably 5 to 50 μm. When the thicknesses of the separators 30 and 60 is less than 1 μm, the mechanical properties cannot be maintained. When the thicknesses of the separators exceeds 100 μm, the separators act as a resistive layer, thereby deteriorating the performance of the battery.

The pore sizes and porosities of the separators 30 and are not particularly limited, but they are preferable that the pore sizes are 0.1 to 50 μm and the porosities are 10 to 95%. If the separators 30 and 60 have the pore sizes of less than 0.1 μm or the porosities of less than 10%, the separators 30 and 60 act as resistive layers. If the separators have the pore sizes of more than 50 μm or the porosities of more than 95%, mechanical properties cannot be maintained.

The electrolyte of the lithium secondary battery is a lithium salt-containing electrolyte solution which is a non-aqueous electrolyte consisting of a non-aqueous organic solvent electrolyte solution and a lithium salt, and also may comprise an organic solid electrolyte or an inorganic solid electrolyte but is not limited thereto.

The non-aqueous organic solvent may be aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyltetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, triester phosphate, trimethoxymethane, dioxolane derivatives, sulfolane, methylsulfolane, 1,3-dimethyl-2-imidazolidinone, propylene carbonate derivatives, tetrahydrofuran derivatives, ethers, methyl propionate, ethyl propionate and the like.

The electrolyte salt contained in the non-aqueous electrolyte solution is a lithium salt. The lithium salt can be used without limitation as long as it is commonly used in an electrolyte solution for a lithium secondary battery. For example, the anion of the lithium salt may comprise any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$및 $(CF_3CF_2SO_2)_2N^-$ or a combination of two or more of these anions.

The organic solvent contained in the non-aqueous electrolyte solution can be used without limitation as long as it is commonly used in an electrolyte for a lithium secondary battery, and for example, ether, ester, amide, linear carbonate, cyclic carbonate and the like may be used alone or in combination of two or more thereof. Among them, carbonate compounds which are typically cyclic carbonate, linear carbonate, or a mixture thereof may be included.

Specific example of the cyclic carbonate compound comprises any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and their halide, or a mixture of two or more thereof. Example of such halides comprises, but is not limited to, fluoroethylene carbonate (FEC) and the like.

Also, specific example of the linear carbonate compound may typically comprise, but are not limited to, any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more thereof.

Particularly, cyclic carbonates such as ethylene carbonate and propylene carbonate among the carbonate-based organic solvents are highly viscous organic solvents and have a high dielectric constant, and thus can dissociate lithium salts in the electrolyte much better. When these cyclic carbonates are mixed with linear carbonates with a low viscosity and a low dielectric constant, such as dimethyl carbonate and diethyl carbonate, at a suitable ratio, an electrolyte solution having the higher electrical conductivity can be prepared.

In addition, the ether among the above organic solvents may be, but is not limited to, any one selected from the group consisting of dimethyl ether, diethyl ether, dipropyl ether, methylethyl ether, methylpropyl ether and ethylpropyl ether, or a mixture of two or more thereof.

In addition, the ester among the above organic solvents may be, but is not limited to, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more thereof.

The injection of the non-aqueous electrolyte solution can be performed at an appropriate stage during the manufacturing process of the electrochemical device, depending on the manufacturing process and required physical properties of the final product. That is, such injection can be carried out before assembling the electrochemical device or in the final stage of assembling the electrochemical device.

The organic solid electrolyte may be, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, polymer containing an ionic dissociation group and the like.

The inorganic solid electrolyte may be, for example, nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Also, in order to improve the characteristics of charging/discharging, flame retardancy, etc., for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidine, ethylene glycol dialkyl ether, ammonium salt, pyrrole, 2-methoxyethanol, aluminum trichloride, etc. may be added to the non-aqueous electrolyte. In some cases, halogen-containing solvents such as carbon tetrachloride and ethylene trifluoride may be further added in order to impart nonflammability, and carbon dioxide gas may be further included in order to improve the high-temperature conservation characteristics.

The type of lithium secondary battery as described above is not particularly limited, and may be, for example, a jelly-roll type, a stack type, a stack-folding type (including a stack-Z-folding type), or a lamination-stack type, preferably a stack-folding type.

The electrode assembly in which the positive electrode, the separator, and the negative electrode are sequentially stacked is prepared, and the electrode assembly is inserted into the battery case, and then the electrolyte solution is injected into the upper part of the case and sealed with cap plate and gasket to assemble the lithium secondary battery.

In this case, the lithium secondary battery can be classified into various types of batteries such as lithium-sulfur battery, lithium-air battery, lithium-oxide battery, and lithium all-solid-state battery depending on the type of positive electrode material and separator used, can be classified into cylindrical, rectangular, coin-shaped, pouch type depending on the type, and can be divided into bulk type and thin film type depending on the size. The structure and manufacturing method of these batteries are well known in the art, and thus detailed description thereof is omitted.

The lithium secondary battery according to the present invention can be used as a power source for devices requiring high capacity and high rate characteristics, etc. Specific examples of the device may include, but are not limited to, a power tool that is powered by a battery powered motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system, Hereinafter, it will be apparent to those skilled in the art that although the preferred embodiments are shown to facilitate understanding of the present invention, the following examples illustrate only the present invention and various changes and modifications may be made within the scope and spirit of the present invention. It is also natural that such variations and modifications are within the scope of the appended claims.

EXAMPLES

Example 1: Manufacture of Anode Free Battery (1) Manufacture of Positive Electrode To 30 ml of N-methyl-2-pyrrolidone, 15 g of LCO ($LiCoO_2$) and L2N($Li_2NiO_2$) in a weight ratio of 10%, 20%, 30%, 40%, 50%, 60%, 70%, 80% and 90% relative to the LCO were added, and these positive electrode active materials are defined as mixed compositions A1 to A9, the mixed composition (A1 to A9) of positive electrode active materials, the super-P and the binder (PVdF) were mixed at a weight ratio of 95:2.5:2.5 of the mixed composition (A1 to A9) of positive electrode active materials:the super-P:the binder (PVdF), and then mixed using a paste face mixer for 30 minutes to prepare a slurry composition.

Subsequently, the slurry composition prepared above was coated on a current collector (Al Foil, thickness 20 μm) and dried at 130° C. for 12 hours to manufacture respective positive electrodes.

(2) Manufacture of Lithium Secondary Battery

A copper current collector was used as the negative electrode current collector 21.

An electrode assembly was manufactured by interposing a porous polyethylene separator between the positive electrode manufactured in item (1) above and the negative electrode current collector 21, and the electrode assembly was placed inside the case and then the electrolyte was injected to manufacture a lithium secondary battery. In this case, the electrolyte was prepared by dissolving 1 M $LiPF_6$ and 2 wt. % of VC (Vinylene Carbonate) in an organic solvent having a volume ratio of 1:2:1 of EC (ethylene carbonate):DEC (diethyl carbonate):DMC (dimethyl carbonate).

Example 2: Manufacture of Anode Free Battery (1) Manufacture of Positive Electrode To 30 ml of N-methyl-2-pyrrolidone, 15 g of LCO ($LiCoO_2$) and LMO ($LiMnO_2$) in a weight ratio of 10%, 20%, 30%, 40%, 50%, 60%, 70%, 80% and 90% relative to the LCO were added, and these positive electrode active materials are defined as mixed compositions B1 to B9, the mixed composition (B1 to B9) of positive electrode active materials, the super-P and the binder (PVdF) were mixed at a weight ratio of 95:2.5:2.5 of the mixed composition (B1 to B9) of positive electrode active materials: the super-P: the binder (PVdF), and then mixed using a paste face mixer for 30 minutes to prepare a slurry composition.

Subsequently, the slurry composition prepared above was coated on a current collector (A1 Foil, thickness 20 μm) and dried at 130° C. for 12 hours to manufacture respective positive electrodes.

(2) Manufacture of Lithium Secondary Battery

A copper current collector was used as the negative electrode current collector 21.

An electrode assembly was manufactured by interposing a porous polyethylene separator between the positive electrode manufactured in item (1) above and the negative electrode current collector 21, and the electrode assembly was placed inside the case and then the electrolyte was injected to manufacture a lithium secondary battery. In this case, the electrolyte was prepared by dissolving 1 M $LiPF_6$ and 2 wt. % of VC (Vinylene Carbonate) in an organic solvent having a volume ratio of 1:2:1 of EC (ethylene carbonate):DEC (diethyl carbonate):DMC (dimethyl carbonate).

Example 3: Manufacture of Anode Free Battery (1) Manufacture of Positive Electrode To 30 ml of N-methyl-2-pyrrolidone, 15 g of LFP ($LiFePO_4$) and LMO($LiMnO_2$) in a weight ratio of 30% and 90% relative to the LFP were added, and these positive electrode active materials are defined as mixed compositions C1 and C2, the mixed composition (C1 and C2) of positive electrode active materials, the super-P and the binder (PVdF) were mixed at a weight ratio of 90:5:5 of the mixed composition (C1 and C2) of positive electrode active materials: the super-P: the binder (PVdF), and then mixed using a paste face mixer for 30 minutes to prepare a slurry composition.

Subsequently, the slurry composition prepared above was coated on a current collector (A1 Foil, thickness 20 μm) and dried at 130° C. for 12 hours to manufacture respective positive electrodes.

(2) Manufacture of Lithium Secondary Battery

A copper current collector was used as the negative electrode current collector 21.

An electrode assembly was manufactured by interposing a porous polyethylene separator between the positive electrode manufactured in item (1) above and the negative electrode current collector 21, and the electrode assembly was placed inside the case and then the electrolyte solutions A to C were injected as an electrolyte respectively to manufacture lithium secondary batteries. In this case, the electrolyte solution A was prepared by dissolving 1 M LiFSI and 2 wt. % of $LiNO_3$ in an organic solvent having a volume ratio of 1:1 of DOL:DME, the electrolyte solution B was the electrolyte solution B (EC:DEC, 1:1 vol. % $LiBF_4$ 1M) as described in Example 1 of Korean Patent Laid-open Publication No. 2016-0138120 and the electrolyte solution C was the electrolyte solution G-3 (PC, $LiBF_4$ 1M, FEC 20%) as described in Example 4 of Korean Patent Laid-open Publication No. 2016-0138120.

Example 4: Manufacture of Anode Free Battery With PEO Protective Layer (1) Manufacture of Positive Electrode A positive electrode was prepared in the same manner as in B-3 of Example 2. Specifically, to 30 ml of N-methyl-2-pyrrolidone, a mixture of LCO($LiCoO_2$), the super-P and the binder (PVdF) mixed at a weight ratio of 95:2.5:2.5 of LCO($LiCoO_2$): the super-P: the binder (PVdF) was added, and then 30 wt. % of LMO($LiMnO_2$) relative to LCO was added, and then mixed using a paste face mixer for 30 minutes to prepare a slurry composition.

Subsequently, the slurry composition prepared above was coated on a current collector (A1 Foil, thickness 20 μm) and dried at 130° C. for 12 hours to manufacture respective positive electrode.

(2) Manufacture of Negative Electrode Current Collector 21 with Protective Layer A solution for forming a protective layer was prepared by adding polyethylene oxide (MV: 4,000,000) and lithium bis(trifluoromethanesulfonyl) imide (LiTFSI, $((CF_3SO_2)_2NLi)$ at a ratio of EO:Li=9:1 (repeating unit of EO:PEO to an acetonitrile solvent and mixing them.

The solution for forming the protective layer was coated on a copper current collector and then dried at 80° C. for 6 hours to form a protective layer (thickness: 10 μm) on the copper current collector.

(3) Manufacture of Anode Free Battery

An electrode assembly was manufactured by interposing a porous polyethylene separator between the positive electrode manufactured in item (1) above and the negative electrode current collector 21 in item (2) above, and the electrode assembly was placed inside the case and then the electrolyte was injected to manufacture a lithium secondary battery. In this case, the electrolyte was prepared by dissolving 1 M $LiPF_6$ and 2 wt. % of VC (Vinylene Carbonate) in an organic solvent having a volume ratio of 1:2:1 of EC (ethylene carbonate):DEC (diethyl carbonate):DMC (dimethyl carbonate).

Example 5: Manufacture of Anode Free Battery With LiPON Protective Layer (1) Manufacture of Positive Electrode A positive electrode was prepared in the same manner a in B-3 of Example 2. Specifically, to 30 ml of N-methyl-2-pyrrolidone, a mixture of LCO($LiCoO_2$), the super-P and the binder (PVdF) mixed at a weight ratio of 95:2.5:2.5 of LCO($LiCoO_2$):the super-P: the binder (PVdF) was added, and then 30 wt. % of LMO($LiMnO_2$) relative to LCO was added, and then mixed using a paste face mixer for 30 minutes to prepare a slurry composition.

Subsequently, the slurry composition prepared above was coated on a current collector (Al Foil, thickness 20 μm) and dried at 130° C. for 12 hours to manufacture respective positive electrode.

(2) Manufacture of Negative Electrode Current Collector 21 with LiPON Protective Layer For the LiPON protective layer, a coating layer was formed by sputtering for 25 minutes using a $Li_3PO_4$ target in a vacuum chamber under $N_2$ atmosphere. It was confirmed that the thickness of the surface coating layer was controlled according to the deposition time, and the protective layer (thickness: 0.2 μm) was formed on the copper current collector. The thickness of the coating layer formed on the surface of the coating layer was confirmed using a scanning electron microscope.

(3) Manufacture of Lithium Secondary Battery

An electrode assembly was manufactured by interposing a porous polyethylene separator between the positive electrode manufactured in item (1) above and the negative electrode current collector 21 in item (2) above, and the electrode assembly was placed inside the case and then the electrolyte was injected to manufacture an anode free battery. In this case, the electrolyte was prepared by dissolving 1 M $LiPF_6$ and 2 wt. % of VC (Vinylene Carbonate) in an organic solvent having a volume ratio of 1:2:1 of EC (ethylene carbonate) DEC (diethyl carbonate):DMC (dimethyl carbonate).

Comparative Example 1: Manufacture of Lithium Secondary Battery

An anode-free battery with the conventional positive electrode was manufactured without the use of L2N.

(1) Manufacture of Positive Electrode

To 30 ml of N-methyl-2-pyrrolidone, a mixture of LCO ($LiCoO_2$), the super-P and the binder (PVdF) mixed at a weight ratio of 95:2.5:2.5 of LCO($LiCoO_2$):the super-P: the binder (PVdF) was added, and then mixed using a paste face mixer for 30 minutes to prepare a slurry composition. At this time, the weight of the LCO added was 15 g.

Subsequently, the slurry composition prepared above was coated on a current collector (Al Foil, thickness 20 μm) and dried at 130° C. for 12 hours to manufacture a positive electrode.

(2) Manufacture of Negative Electrode

A copper current collector was used as the negative electrode current collector 21.

(3) Manufacture of Lithium Secondary Battery

An electrode assembly was manufactured by interposing a porous polyethylene separator between the positive electrode manufactured in item (1) above and the negative electrode, and the electrode assembly was placed inside the case and then the electrolyte was injected to manufacture an anode free battery. In this case, the electrolyte was prepared by dissolving 1 M $LiPF_6$ and 2 wt. % of VC (Vinylene Carbonate) in an organic solvent having a volume ratio of 1:2:1 of EC (ethylene carbonate):DEC (diethyl carbonate): DMC (dimethyl carbonate).

Comparative Example 2: Manufacture of Anode Free Battery

According to Examples 1 and 4 described in Korean Patent Laid-open Publication No. 2016-0138120, $LiFePO_4$ is used as a positive electrode, and a lithium secondary battery which comprises an organic compound fluoroethylene carbonate containing fluorine and an inorganic salt of sodium borofluorinated borate in the electrolyte solution was manufactured.

Positive electrode: $LiFePO_4$, acetylene black and PVDF were mixed at a ratio of 90:5:5, and a slurry for a positive electrode was prepared using NMP as a solvent.

Negative electrode: Negative electrode current collector (Rolled copper foil current collector) is used.

Electrolyte solution: The electrolyte solution (PC, $LiBF_4$ 1M, FEC 20%) described in Example 4 of Korean Patent Laid-open Publication No. 2016-0138120 was used.

Experimental Example 1: Analysis of Battery Characteristics Depending on the Content of L2N In order to confirm the battery characteristics depending on the difference of the content of LCO:L2N (high-irreversible positive electrode additive) of the lithium metal compound, the anode-free batteries prepared in A1 to A9 of Example 1 and Comparative Example 1 were charged/discharged under the conditions of charging 0.1C, 4.25V CC/CV (5% current cut at 1C) and discharging 0.1C CC 3V to manufacture a lithium secondary battery having the lithium metal layer 23 and measured the capacity per Li area formed after 1 cycle discharging, the initial discharging capacity, the incidence of initial discharging capacity relative to the available capacity of the active material, the number of cycles at the time of reaching 80% remaining capacity relative to the initial capacity, and the number of cycles at 50% remaining capacity relative to the initial discharging capacity, and the results are shown in Table 2 below. In this case, the lithium metal layer 23 thus formed was confirmed by using a scanning electron microscope (JSM-7610F, JEOL). At this time, the available capacity of the LCO was calculated as 150 mAh/g, and the available capacity of L2N was calculated as 110 mAh/g.

TABLE 2

| | LCO ratio | L2N ratio | Capacity per Li area formed after 1 cycle discharging (mAh/cm2) | Initial discharging capacity (mAh/g) | Incidence of initial discharging capacity relative to the available capacity of the active material (%) | Number of cycles at the time of reaching 80% remaining capacity relative to the initial capacity (N) | Number of cycles at 50% remaining capacity relative to the initial discharging capacity (N) |
|---|---|---|---|---|---|---|---|
| Comp. Example 1 | 1 | 0 | 0.07 | 149.3 | 99.5 | 8 | 20 |
| Example 1A-1 | 0.9 | 0.1 | 0.59 | 148.3 | 100 | 33 | 46 |
| Example 1A-2 | 0.8 | 0.2 | 1.12 | 147.3 | 100 | 41 | 53 |
| Example 1A-3 | 0.7 | 0.3 | 1.64 | 146.2 | 100 | 76 | 91 |
| Example 1A-4 | 0.6 | 0.4 | 2.17 | 145.2 | 100 | 100 | 122 |
| Example 1A-5 | 0.5 | 0.5 | 2.69 | 144.2 | 100 | 127 | 180 |
| Example 1A-6 | 0.4 | 0.6 | 3.21 | 143.1 | 100 | 151 | 235 |
| Example 1A-7 | 0.3 | 0.7 | 3.74 | 142.1 | 100 | 75 | 351 |
| Example 1A-8 | 0.2 | 0.8 | 4.26 | 141.1 | 100 | 35 | 462 |
| Example 1A-9 | 0.1 | 0.9 | 4.79 | 140.0 | 100 | 19 | 528 |

The above A-1 to A-9 show the difference in the mixing composition of the positive electrode active materials as described in Example 1.

Experimental Example 2: Analysis of Battery Characteristics Depending on the Content of LMO In order to confirm the battery characteristics depending on the difference of the content of LCO:LMO (high-irreversible positive electrode additive) of the lithium metal compound, the anode-free batteries prepared in B1 to B9 of Example 2 and Comparative Example 1 were charged/discharged under the conditions of charging 0.1C, 4.25V CC/CV (5% current cut at 1C) and discharging 0.1C CC 3V to manufacture a lithium secondary battery having the lithium metal layer 23 and measured the capacity per Li area formed after 1 cycle discharging, the initial discharging capacity, the incidence of initial discharging capacity relative to the available capacity of the active material, the number of cycles at the time of reaching 80% remaining capacity relative to the initial capacity, and the number of cycles at 50% remaining capacity relative to the initial discharging capacity, and the results are shown in Table 2 below. In this case, the lithium metal layer 23 thus formed was confirmed by using a scanning electron microscope (JSM-7610F, JEOL). At this time, the available capacity of the LCO was calculated as 150 mAh/g, and the available capacity of LMO was calculated as 100 mAh/g.

TABLE 3

| | LCO ratio | LMO ratio | Capacity per Li area formed after 1 cycle discharging (mAh/cm2) | Initial discharging capacity (mAh/g) | Incidence of initial discharging capacity relative to the available capacity of the active material (%) | Number of cycles at the time of reaching 80% remaining capacity relative to the initial capacity (N) | Number of cycles at 50% remaining capacity relative to the initial discharging capacity (N) |
|---|---|---|---|---|---|---|---|
| Comp. Example 1 | 1 | 0 | 0.07 | 149.3 | 99.5 | 8 | 20 |
| Example 2B-1 | 0.9 | 0.1 | 0.45 | 144.4 | 99.6 | 28 | 42 |
| Example 2B-2 | 0.8 | 0.2 | 0.84 | 139.5 | 99.6 | 45 | 64 |
| Example 2B-3 | 0.7 | 0.3 | 1.22 | 134.5 | 99.6 | 66 | 83 |
| Example 2B-4 | 0.6 | 0.4 | 1.60 | 129.6 | 99.7 | 81 | 105 |
| Example 2B-5 | 0.5 | 0.5 | 1.98 | 124.7 | 99.7 | 112 | 146 |
| Example 2B-6 | 0.4 | 0.6 | 2.37 | 119.7 | 99.8 | 150 | 194 |
| Example 2B-7 | 0.3 | 0.7 | 2.75 | 114.8 | 99.8 | 167 | 226 |
| Example 2B-8 | 0.2 | 0.8 | 3.13 | 109.9 | 99.9 | 172 | 287 |
| Example 2B-9 | 0.1 | 0.9 | 3.52 | 104.9 | 99.9 | 154 | 328 |

The above B-1 to B-9 show the difference in the mixing composition of the positive electrode active materials as described in Example 2.

Experimental Example 3: Analysis of Battery Characteristics Depending on the Content of LMO and the Type of Electrolyte Solution In order to confirm the battery characteristics depending on the difference of the content of LFP:LMO (high-irreversible positive electrode additive) of the lithium metal compound and the type of electrolyte solution, the anode-free batteries prepared in C1 and C2 of Example 3 and Comparative Example 2 were charged/discharged under the conditions of charging 0.1C, 4.25V CC/CV (5% current cut at 1C) and discharging 0.1C CC 3V to manufacture a lithium secondary battery having the lithium metal layer 23 and measured the capacity per Li area formed after 1 cycle discharging, the initial discharging capacity, the incidence of initial discharging capacity relative to the available capacity of the active material, the number of cycles at the time of reaching 80% remaining capacity relative to the initial capacity, and the number of cycles at 50% remaining capacity relative to the initial discharging capacity, and the results are shown in Table 2 below. In this case, the lithium metal layer 23 thus formed was confirmed by using a scanning electron microscope (JSM-7610F, JEOL). At this time, the available capacity of the LFP was calculated as 150 mAh/g, and the available capacity of LMO was calculated as 100 mAh/g.

TABLE 4

| | Eelctrolyte solution | LFP ratio | LMO ratio | Capacity per Li area formed after 1 cycle discharging (mAh/cm2) | Initial discharging capacity (mAh/g) | Incidence of initial discharging capacity relative to the available capacity of the active material (%) | Number of cycles at the time of reaching 80% remaining capacity relative to the initial capacity (N) | Number of cycles at 50% remaining capacity relative to the initial discharging capacity (N) |
|---|---|---|---|---|---|---|---|---|
| Comp. Example 2 | Electrolyte solution A | 1 | 0 | 0.02 | 155.1 | 100 | 5 | 18 |
| | Electrolyte solution B | 1 | 0 | 0.03 | 121 | 80 | 3 | 6 |
| | Electrolyte solution C | 1 | 0 | 0.02 | 129 | 86 | 5 | 10 |
| Example 3 C-1 | Electrolyte solution A | 0.7 | 0.3 | 1.19 | 138.6 | 100 | 67 | 95 |
| | Electrolyte solution B | 0.7 | 0.3 | 1.15 | 138.6 | 85 | 22 | 37 |
| | Electrolyte solution C | 0.7 | 0.3 | 1.18 | 138.6 | 89 | 40 | 61 |
| Example 3 C-2 | Electrolyte solution A | 0.1 | 0.9 | 3.51 | 105.5 | 100 | 174 | 387 |
| | Electrolyte solution B | 0.1 | 0.9 | 3.48 | 105.5 | 97 | 59 | 113 |
| | Electrolyte solution C | 0.1 | 0.9 | 3.51 | 105.5 | 98 | 87 | 149 |

The above C-1 and C-9 show the difference in the mixing composition of the positive electrode active materials as described in Example 3.

The above electrolyte solutions A to C show the difference in the electrolyte solutions as described in Example 3

Experimental Example 4: Analysis of Battery Characteristics Depending on the Protective Layer In order to confirm the battery characteristics depending on the formation of the protective layer, the anode-free batteries prepared in Examples 2 to 4 and Comparative Example 1 were charged/discharged under the conditions of charging 0.1C, 4.25V CC/CV (5% current cut at 1C) and discharging 0.1C CC 3V to manufacture a lithium secondary battery having the lithium metal layer 23 and measured the capacity per Li area formed after 1 cycle discharging, the initial discharging capacity, the incidence of initial discharging capacity relative to the available capacity of the active material, the number of cycles at the time of reaching 80% remaining capacity relative to the initial capacity, and the number of cycles at 50% remaining capacity relative to the initial discharging capacity, and the results are shown in Table 2 below. In this case, the lithium metal layer 23 thus formed was confirmed by using a scanning electron microscope (JSM-7610F, JEOL). At this time, the available capacity of the LCO was calculated as 150 mAh/g, and the available capacity of LMO was calculated as 100 mAh/g.

TABLE 5

| | Protective layer | LCO ratio | LMO ratio | Capacity per Li area formed after 1 cycle discharging (mAh/cm2) | Initial discharging capacity (mAh/g) | Incidence of initial discharging capacity relative to the available capacity of the active material (%) | Number of cycles at the time of reaching 80% remaining capacity relative to the initial capacity (N) | Number of cycles at 50% remaining capacity relative to the initial discharging capacity (N) |
|---|---|---|---|---|---|---|---|---|
| Comparative Example 1 | Non | 1 | 0 | 0.07 | 149.3 | 99.5 | 8 | 20 |
| Example 2 B-3 | Non | 0.7 | 0.3 | 1.22 | 134.5 | 99.6 | 66 | 83 |
| Example 4 | PEO | 0.7 | 0.3 | 1.22 | 134.3 | 99.5 | 61 | 90 |
| Example 5 | LiPON | 0.7 | 0.3 | 1.2 | 130.1 | 96.4 | 73 | 99 |

The above B-3 shows the mixing composition of the positive electrode active material as described in Example 2.

From the results of Experimental Examples 1 to 4, it was found that the cycle life of Examples 1 to 3 is improved compared to Comparative Example 1 where no high-irreversible additive is used, and especially that the higher the proportion of high-irreversible additives, the better the service life.

Also, comparing the high-irreversible additives L2N and LMO, it was found that the cycle of 80% remaining capacity is good for LMO and the cycle of 50% remaining capacity is good for L2N.

Also, in the case of the LFP active material, it was found that it is more effective when $LiNO_3$ additive is added to a DOL/DME ether-based electrolyte solution than when using FEC or $LiBF_4$ as the electrolyte solution Also, in the case of Examples 4 to 5 with a protective layer, it was found that the initial capacity or the increase in the number of cycles of 80% remaining capacity is small, but the number of cycles of 50% remaining capacity is increased.

DESCRIPTION OF SYMBOLS

10, 40: Positive electrode
11, 41: Positive electrode current collector
13, 43: Positive electrode mixture
20, 50: Negative electrode
21, 51: Negative electrode current collector
23, 53: Lithium metal layer
30, 60: Separator
55: Protective layer

The invention claimed is:

1. A lithium secondary battery comprising a positive electrode, a negative electrode, a separator between the positive and negative electrode and an electrolyte interposed therebetween, wherein the positive electrode comprises a positive electrode active material and a lithium metal compound with an initial irreversibility 60% or more in a positive electrode mixture, wherein lithium metal is formed on a negative electrode current collector in the negative electrode, wherein the lithium metal moves from the positive electrode to the negative electrode when the battery is charged, and wherein the positive electrode mixture comprises the positive electrode active material and the lithium metal compound in a weight ratio of 4:6 to 6:4 of the positive electrode active material: the lithium metal compound, wherein the lithium metal compound is represented by any one of the following Formulas 1 to 8:

$$Li_2Ni_{1-a}M^1_aO_2 \quad \text{[Formula 1]}$$

wherein a is $0 \le a < 1$, and $M^1$ is at least one element selected from the group consisting of Mn, Fe, Co, Cu, Zn, Mg and Cd;

$$Li_{2+b}Ni_{1-c}M^2_cO_{2+d} \quad \text{[Formula 2]}$$

wherein $-0.5 \le b < 0.5$, $0 \le c \le 1$, and $0 \le d < 0.3$, and $M^2$ is at least one element selected from the group consisting of P, B, C, Al, Sc, Sr, Ti, V, Zr, Mn, Fe, Co, Cu, Zn, Cr, Mg, Nb, Mo and Cd;

$$LiM^3_eMn_{1-e}O_2 \quad \text{[Formula 3]}$$

wherein e is $0 \le e < 0.5$, and $M^3$ is at least one element selected from the group consisting of Cr, Al, Ni, Mn and Co;

$$Li_2M^4O_2 \quad \text{[Formula 4]}$$

wherein $M^4$ is Ni;

$$Li_{3+f}Nb_{1-g}M^5_gS_{4-h} \quad \text{[Formula 5]}$$

wherein $-0.1 \le f \le 1$, $0 \le g \le 0.5$, and $-0.1 \le h \le 0.5$, and $M^5$ is at least one element selected from the group consisting of Mn, Fe, Co, Cu, Zn, Mg and Cd;

$$LiM^6_iMn_{1-i}O_2 \quad \text{[Formula 6]}$$

wherein i is $0.05 \le i < 0.5$, and $M^6$ is at least one element selected from the group consisting of Cr, Al, Ni, Mn, and Co;

$$LiM^7_{2j}Mn_{2-2j}O_4 \quad \text{[Formula 7]}$$

wherein j is $0.05 \leq x < 0.5$ $0.05 \leq j < 0.5$, and $M^7$ is at least one element selected from the group consisting of Cr, Al, Ni, Mn, and Co;

$$Li_k\text{-}M^8_m\text{—}N_n \quad \text{[Formula 8]}$$

wherein $M^8$ is an alkaline earth metal, k/(k+m+n) is 0.10 to 0.40, m/(k+m+n) is 0.20 to 0.50, n/(k+m+n) is 0.20 to 0.50.

2. The lithium secondary battery of claim 1, wherein the lithium metal which is formed on the negative electrode current collector is formed through one-time charge in a voltage range of 4.5V to 2.5V.

3. The lithium secondary battery of claim 1, wherein the lithium metal compound has an initial charging capacity of 200 mAh/g or more.

4. The lithium secondary battery of claim 1, wherein the negative electrode further comprises a protective layer formed on a surface in contact with the separator.

5. The lithium secondary battery of claim 4, wherein the protective layer comprises at least one of a lithium ion conductive polymer or an inorganic solid electrolyte.

6. The lithium secondary battery of claim 5, wherein the lithium ion conductive polymer is at least one selected from the group consisting of polyethylene oxide (PEO), polyacrylonitrile (PAN), polymethylmethacrylate (PMMA), polyvinylidene fluoride (PVDF), and polyvinylidene fluoride-hexafluoropropylene (PVDF-HFP).

7. The lithium secondary battery of claim 5, wherein the inorganic solid electrolyte is at least one selected from the group consisting of Thio-LISICON($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ (w is w<1), $Li_xLa_{1-x}TiO_3$ (0<x<1), $Li_2S$—GeS—$Ga_2S_3$ and $Li_{3.6}Si_{0.6}P_{0.4}O_4$.

8. The lithium secondary battery of claim 5, wherein the protective layer further comprises at least one lithium salt selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic carboxylic acid lithium, 4-phenylboric acid lithium, and lithium imide.

9. The lithium secondary battery of claim 5, wherein the protective layer has a thickness of 10 nm to 50 μm.

10. The lithium secondary battery of claim 1, wherein the positive electrode active material is mixed with or forms a core-shell structure with the lithium metal compound.

11. The lithium secondary battery of claim 1, wherein the positive electrode active material is at least one selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-Y}Co_YO_2$, $LiCo_{1-Y}Mn_YO_2$, $LiNi_{1-Y}Mn_YO_2$ (wherein 0≤Y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (wherein, 0<Z<2), $Li_xM_yMn_{2-y}O_{4-z}A_z$ (wherein 0.9≤x≤1.2, 0<y<2, and 0≤z<0.2, M=at least one of Al, Mg, Ni, Co, Fe, Cr, V, Ti, Cu, B, Ca, Zn, Zr, Nb, Mo, Sr, Sb, W, Ti and Bi, and A is at least one −1-valent or −2-valent anion), $Li_{1+a}Ni_bM'_{1-b}O_{2-c}A'_c$ (wherein 0≤a≤0.1, 0≤b≤0.8, 0≤c<0.2, M' is at least one selected stable 6-coordination element, and A' is at least one −1 valent or −2 valent anion), $LiCoPO_4$, and $LiFePO_4$.

12. The lithium secondary battery of claim 1, wherein the positive electrode mixture further comprise at least one selected from the group consisting of $Li_xVO_3$ (1≤x≤6), $Li_3Fe_2(PO_4)_3$, $Li_3Fe_2(SO_4)_3$, $Li_3V(PO_4)_3$, $MnO_2$, $MoO_3$, $VO_2$, $V_2O_5$, $V_6O_{13}$, $Cr_3O_8$, $CrO_2$, $Al_2O_3$, $ZrO_2$, $AlPO_4$, $SiO_2$, $TiO_2$, and MgO.

13. The lithium secondary battery of claim 1, wherein the positive electrode mixture has a loading amount of 1 to 10 $mAh/cm^2$.

14. The lithium secondary battery of claim 1, wherein the lithium metal is a metal layer having a thickness of 50 nm to 100 μm.

* * * * *